(12) United States Patent
Ikeguchi

(10) Patent No.: US 7,061,542 B1
(45) Date of Patent: Jun. 13, 2006

(54) TELEVISION RECEIVING METHOD AND TELEVISION RECEIVER

(75) Inventor: Yasuyuki Ikeguchi, Itami (JP)

(73) Assignee: Sanyo Electric Co., Ltd., Osaka (JP)

( * ) Notice: Subject to any disclaimer, the term of this patent is extended or adjusted under 35 U.S.C. 154(b) by 552 days.

(21) Appl. No.: 09/691,909

(22) Filed: Oct. 20, 2000

(30) Foreign Application Priority Data

Oct. 29, 1999 (JP) ................................ 11-309553

(51) Int. Cl.
*H04N 5/46* (2006.01)
(52) U.S. Cl. .................. 348/558; 348/569; 348/721; 348/726; 348/728; 348/731; 348/732; 455/67.11; 455/67.13; 375/317
(58) Field of Classification Search ................ 348/558, 348/555, 556, 569–570, 584, 721, 725–729, 348/731–733; 455/67.11, 67.13; 375/317; H04N 5/46
See application file for complete search history.

(56) References Cited

U.S. PATENT DOCUMENTS

| | | | | |
|---|---|---|---|---|
| 5,557,337 A | * | 9/1996 | Scarpa | 348/558 |
| 5,559,838 A | * | 9/1996 | Nakagoshi | 375/347 |
| 5,684,525 A | * | 11/1997 | Klosterman | 725/48 |
| 5,710,995 A | * | 1/1998 | Akaiwa et al. | 455/277.2 |
| 5,781,592 A | * | 7/1998 | Masuda | 375/347 |
| 5,966,186 A | * | 10/1999 | Shigihara et al. | 348/570 |
| 5,982,411 A | * | 11/1999 | Eyer et al. | 725/49 |
| 6,064,449 A | * | 5/2000 | White et al. | 348/732 |
| 6,108,044 A | * | 8/2000 | Shin | 348/555 |
| 6,188,447 B1 | * | 2/2001 | Rudolph et al. | 348/729 |
| 6,188,448 B1 | * | 2/2001 | Pauley et al. | 348/731 |
| 6,204,884 B1 | * | 3/2001 | Lee | 348/555 |
| 6,208,338 B1 | * | 3/2001 | Fischer et al. | 345/705 |
| 6,252,634 B1 | * | 6/2001 | Yuen et al. | 348/731 |
| 6,340,997 B1 | * | 1/2002 | Borseth | 348/731 |
| 6,353,463 B1 | * | 3/2002 | Seo | 348/731 |
| 6,359,580 B1 | * | 3/2002 | Morrison | 348/731 |
| 6,389,070 B1 | * | 5/2002 | Cugnini et al. | 375/232 |
| 6,430,165 B1 | * | 8/2002 | Arsenault | 370/316 |
| 6,483,547 B1 | * | 11/2002 | Eyer | 348/473 |
| 6,483,553 B1 | * | 11/2002 | Jung | 348/731 |
| 6,486,925 B1 | * | 11/2002 | Ko | 348/731 |
| 6,490,001 B1 | * | 12/2002 | Shintani et al. | 348/554 |
| 6,501,510 B1 | * | 12/2002 | Moon | 348/553 |
| 6,529,680 B1 | * | 3/2003 | Broberg | 386/83 |
| 6,538,704 B1 | * | 3/2003 | Grabb et al. | 348/731 |
| 6,549,243 B1 | * | 4/2003 | Takashimizu et al. | 348/558 |
| 6,633,325 B1 | * | 10/2003 | Lee | 348/21 |
| 6,661,855 B1 | * | 12/2003 | Kim | 375/343 |
| 6,700,624 B1 | * | 3/2004 | Yun | 348/555 |
| 6,727,960 B1 | * | 4/2004 | Seo | 348/731 |

(Continued)

FOREIGN PATENT DOCUMENTS

EP 0869673 * 7/1998

(Continued)

*Primary Examiner*—Brian P. Yenke
(74) *Attorney, Agent, or Firm*—Arent Fox PLLC

(57) ABSTRACT

A receiving section for digital television broadcasting and a receiving section for analog television broadcasting are provided. When a digital television broadcasting program is selected, it is judged whether or not an analog television broadcasting program having the same contents as those of the selected digital television broadcasting program is being broadcast. In a case where the analog television broadcasting program having the same contents as those of the selected digital television broadcasting program is being broadcast, when the digital television broadcasting program cannot be received, the analog television broadcasting program having the same contents as those of the selected digital television broadcasting program is received and outputted.

2 Claims, 4 Drawing Sheets

U.S. PATENT DOCUMENTS

| | | | |
|---|---|---|---|
| 6,741,293 B1 * | 5/2004 | Obuchi | 348/554 |
| 2003/0119449 A1 * | 6/2003 | Talmola | 455/67.1 |

FOREIGN PATENT DOCUMENTS

| | | |
|---|---|---|
| JP | 04-369189 | 12/1992 |
| JP | 06-006701 | 1/1994 |
| JP | 06-078232 | 3/1994 |
| JP | 08-140004 | 5/1996 |
| JP | 11-187324 | 7/1999 |

* cited by examiner

TELEVISION RECEIVING METHOD AND TELEVISION RECEIVER

BACKGROUND OF THE INVENTION

1. Field of the Invention

The present invention relates to a television receiving method and a television receiver.

2. Description of the Prior Art

Today, the trend of television broadcasting has been toward digitization. In Europe and the United States, digital television broadcasting has been put to practical use. In the digital television broadcasting, voices (audios) and images (videos) are digitally coded by an MPEG (Motion Picture Expert Group)-2 system, are modulated by a digital modulation system employed in each of areas, and are transmitted. As the modulation system, an OFDM (Orthogonal Frequency Division Multiplexing) system and an 8-VSB (Vestigial Sideband) system are respectively employed in Europe and the United States. Also in Japan, experiments in a system based on the OFDM system have been conducted.

The digital broadcasting is characterized in that broadcasting of higher video quality and higher audio quality can be done in the same frequency band, as compared with conventional analog broadcasting, and approximately three programs can be simultaneously broadcast if the video quality and the audio quality in the broadcasting are approximately the same as those in the conventional analog broadcasting.

A time period during which ground wave digital broadcasting is introduced differs depending on the areas by the circumstances of the construction of broadcasting facilities. In order not to affect viewers of the conventional analog broadcasting, the analog broadcasting is continued until it is shifted to the digital broadcasting. Further, in order to promote the shift of the viewers to the digital broadcasting, there are many cases in which a program having the same contents as those of a program broadcast in the analog broadcasting is also broadcast in the digital broadcasting, and the analog broadcasting program which is being simultaneously broadcast can be also viewed in a digital broadcasting receiver.

FIG. 4 illustrates the configuration of a television receiver which is expected to be used in a time period during which digital ground wave broadcasting is introduced.

Reference numeral 100a denotes an antenna for analog television broadcasting, reference numeral 101 denotes an analog broadcasting tuner for selecting a desired channel frequency in analog broadcasting, reference numeral 102 denotes an analog broadcasting demodulator for detecting and demodulating analog broadcasting waves and converting the analog broadcasting waves into an audio/video signal, and reference numeral 103 denotes an audio/video processor for converting the audio/video signal into a signal in such a form that it can be outputted to an audio/video output device 111.

Reference numeral 100b denotes an antenna for digital television broadcasting, reference numeral 105 denotes a digital broadcasting tuner for selecting a desired frequency channel in digital broadcasting, reference numeral 106 denotes a digital broadcasting demodulator for converting received broadcasting waves into digital data, reference numeral 107 denotes an error correcting device for detecting and correcting errors by an error correcting function to which the digital data has been previously subjected, reference numeral 109 denotes an audio/video decoder for converting digital audio/video data into data in such a form that it can be outputted to the audio/video output device 111, reference numeral 110 denotes a switching device for selectively outputting received audios and videos in analog broadcasting and digital broadcasting, reference numeral 111 denotes an audio/video output device comprising a cathode ray tube, a speaker, and their peripheral circuits for outputting the received audios and videos, and reference numeral 112 denotes a control microcomputer for carrying out control of a system, for example, control of channel selection.

In a time period during which ground wave digital broadcasting is introduced, it is generally considered that digital and analog receiving systems are thus provided in a television receiver, to make both digital and analog broadcasting waves receivable. The analog broadcasting waves are inputted to one of input terminals of the switching device 110 through the antenna 100a, the analog broadcasting tuner 101, the analog broadcasting demodulator 102, and the audio/video processor 103. The digital broadcasting waves are inputted to the other input terminal of the switching device 110 through the antenna 10b, the digital broadcasting tuner 105, the digital broad casting demodulator 106, the error correcting device 107, and the audio/video decoder 109.

The control microcomputer 112 switches the switching device 110 to the analog side or the digital side upon receipt of an instruction to perform channel selection from a user, and issues an instruction to select a frequency to the analog broadcasting tuner 101 or the digital broadcasting tuner 105. Consequently, audios and videos on a channel desired by the user are outputted to the audio/video output device 111.

Even if the ground wave digital broadcasting is introduced, all areas are not covered at one time by digital broadcasting, and a time period during which the ground wave digital broadcasting is introduced differs depending on the areas. When the television receiver is moved to the outside of a service area where the ground wave digital broadcasting has not been introduced from the area where the ground wave digital broadcasting has been introduced, therefore, a program which is being viewed may, in some cases, be unreceivable. Even in the area where the ground wave digital broadcasting is introduced, it is considered that there is a place where the digital broadcasting is unreceivable, for example, a place concealed behind an office building particularly at the time of mobile receiving.

Even in the area where the ground wave digital broadcasting has been introduced, the analog broadcasting is continued for the time being in order to protect viewers. In the area where both the digital broadcasting and the analog broadcasting are done, it is considered that the receiving conditions of the analog broadcasting and the digital broadcasting differ particularly at the time of mobile receiving depending on conditions such as the difference between the propagation characteristics of analog and digital broadcasting waves and the difference in the position of a transmitting antenna. That is, even when the user enters the place concealed behind the office building where the digital broadcasting cannot be received during mobile receiving, the analog broadcasting of a certain degree of quality may be receivable. An operation for selecting a program every time the digital broadcasting cannot be received by the user is troublesome.

SUMMARY OF THE INVENTION

An object of the present invention is to provide a television receiving method and a television receiver capable of selecting, when a program having the same contents as those of a selected digital television broadcasting program is also broadcast in analog television broadcasting, broadcasting in which good audios and videos can be automatically received.

A television receiving method according to the present invention is characterized by comprising the steps of providing a receiving section for digital television broadcasting and a receiving section for analog television broadcasting; judging, when a digital television broadcasting program is selected, whether or not an analog television broadcasting program having the same contents as those of the selected digital television broadcasting program is being broadcast; and receiving and outputting, in a case where the analog television broadcasting program having the same contents as those of the selected digital television broadcasting program is being broadcast, the analog television broadcasting program having the same contents as those of the selected digital television broadcasting program when the digital television broadcasting cannot be received.

Judgment whether or not the analog television broadcasting program having the same contents as those of the selected digital television broadcasting program is being broadcast is made on the basis of channel map information included in additional information sent as a part of broadcasting data relating to the digital television broadcasting, for example.

Judgment whether or not the analog television broadcasting program having the same contents as those of the selected digital television broadcasting program is being broadcast is made on the basis of channel map information previously stored in a storage device at the time of shipment from a factory, for example.

Judgment whether or not the analog television broadcasting program having the same contents as those of the selected digital television broadcasting program is being broadcast is made by comparing signal waveforms in the received digital television broadcasting and the analog television broadcasting on each of channels, for example.

A first television receiver according to the present invention is characterized by comprising a receiving section for digital television broadcasting; a receiving section for analog television broadcasting; switching means for switching an output of the receiving section for digital television broadcasting and an output of the receiving section for analog television broadcasting; means for causing, when a digital television broadcasting program is selected, the receiving section for digital television broadcasting to receive the selected digital television broadcasting program, controlling the switching means so as to select the output of the receiving section for digital television broadcasting, and judging whether or not an analog television broadcasting program having the same contents as those of the selected digital television broadcasting program is being broadcast; means for causing, when the analog television broadcasting program having the same contents as those of the selected digital television broadcasting program is being broadcast, the receiving section for analog television broadcasting to receive the analog television broadcasting program having the same contents as those of the selected digital television broadcasting program; and means for controlling, in a case where the analog television broadcasting program having the same contents as those of the selected digital television broadcasting program is being broadcast, the switching means so as to select the output of the receiving section for analog television broadcasting.

A second television receiver according to the present invention is characterized by comprising a receiving section for digital television broadcasting; a receiving section for analog television broadcasting; a switching circuit for switching an output of the receiving section for digital television broadcasting and an output of the receiving section for analog television broadcasting; a circuit for causing, when a digital television broadcasting program is selected, the receiving section for digital television broadcasting to receive the selected digital television broadcasting program, controlling the switching circuit so as to select the output of the receiving section for digital television broadcasting, and judging whether or not an analog television broadcasting program having the same contents as those of the selected digital television broadcasting program is being broadcast; a circuit for causing, when the analog television broadcasting program having the same contents as those of the selected digital television broadcasting program is being broadcast, the receiving section for analog television broadcasting to receive the analog television broadcasting program having the same contents as those of the selected digital television broadcasting program; and a circuit for controlling, in a case where the analog television broadcasting program having the same contents as those of the selected digital television broadcasting program is being broadcast, the switching circuit so as to select the output of the receiving section for analog television broadcasting.

Judgment whether or not the analog television broadcasting program having the same contents as those of the selected digital television broadcasting program is being broadcast is made on the basis of channel map information included in additional information sent as a part of broadcasting data relating to the digital television broadcasting, for example.

Judgment whether or not the analog television broadcasting program having the same contents as those of the selected digital television broadcasting program is being broadcast is made on the basis of channel map information previously stored in a storage device at the time of shipment from a factory, for example.

Judgment whether or not the analog television broadcasting program having the same contents as those of the selected digital television broadcasting program is being broadcast is made by comparing signal waveforms in the received digital television broadcasting and the analog television broadcasting on each of channels, for example.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

[1] Description of First Embodiment

Figure 1:
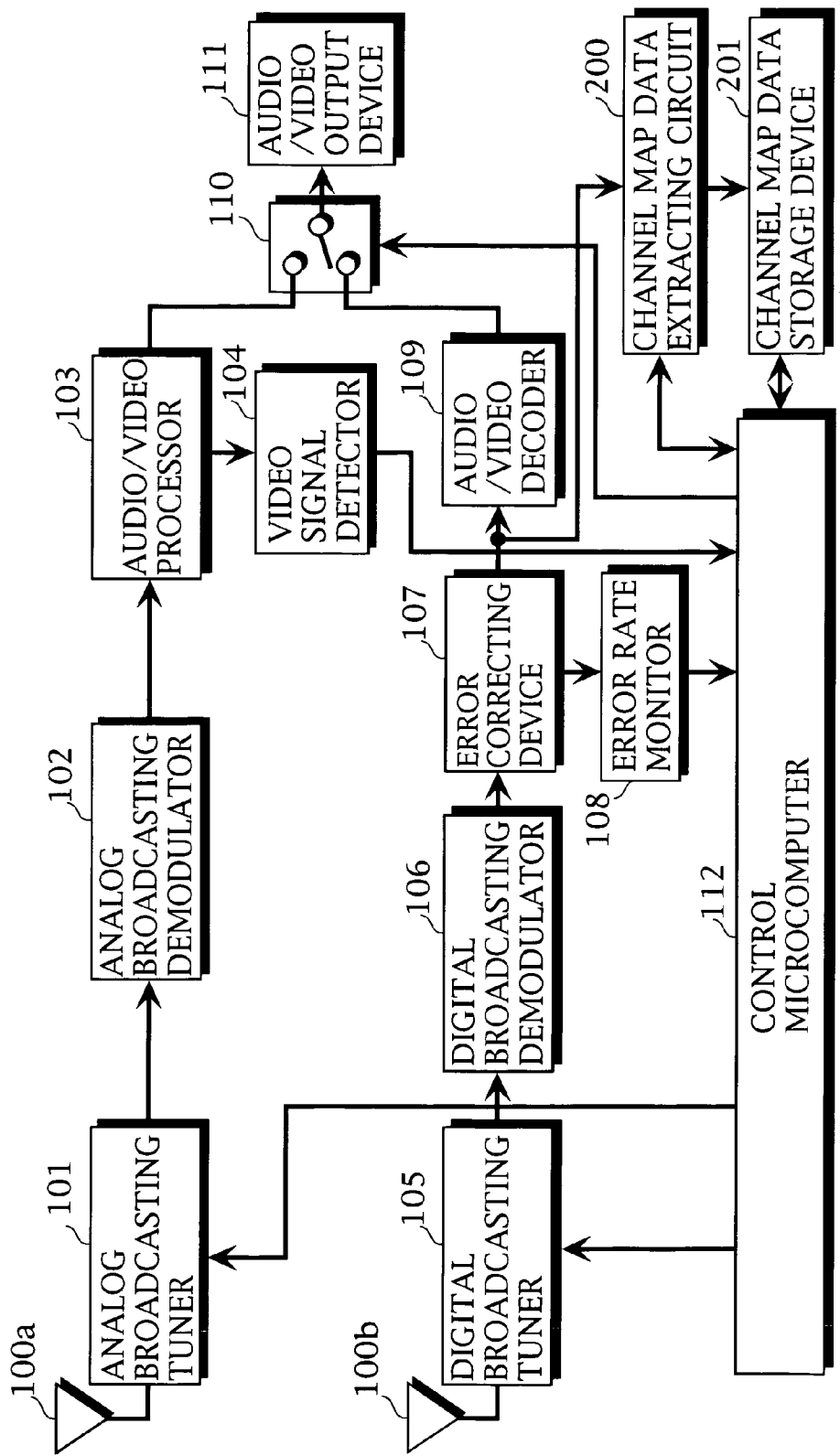
FIG. 1 is a block diagram showing the configuration of a television receiver according to a first embodiment.

FIG. 1 illustrates the configuration of a television receiver according to a first embodiment.

Figure 4:
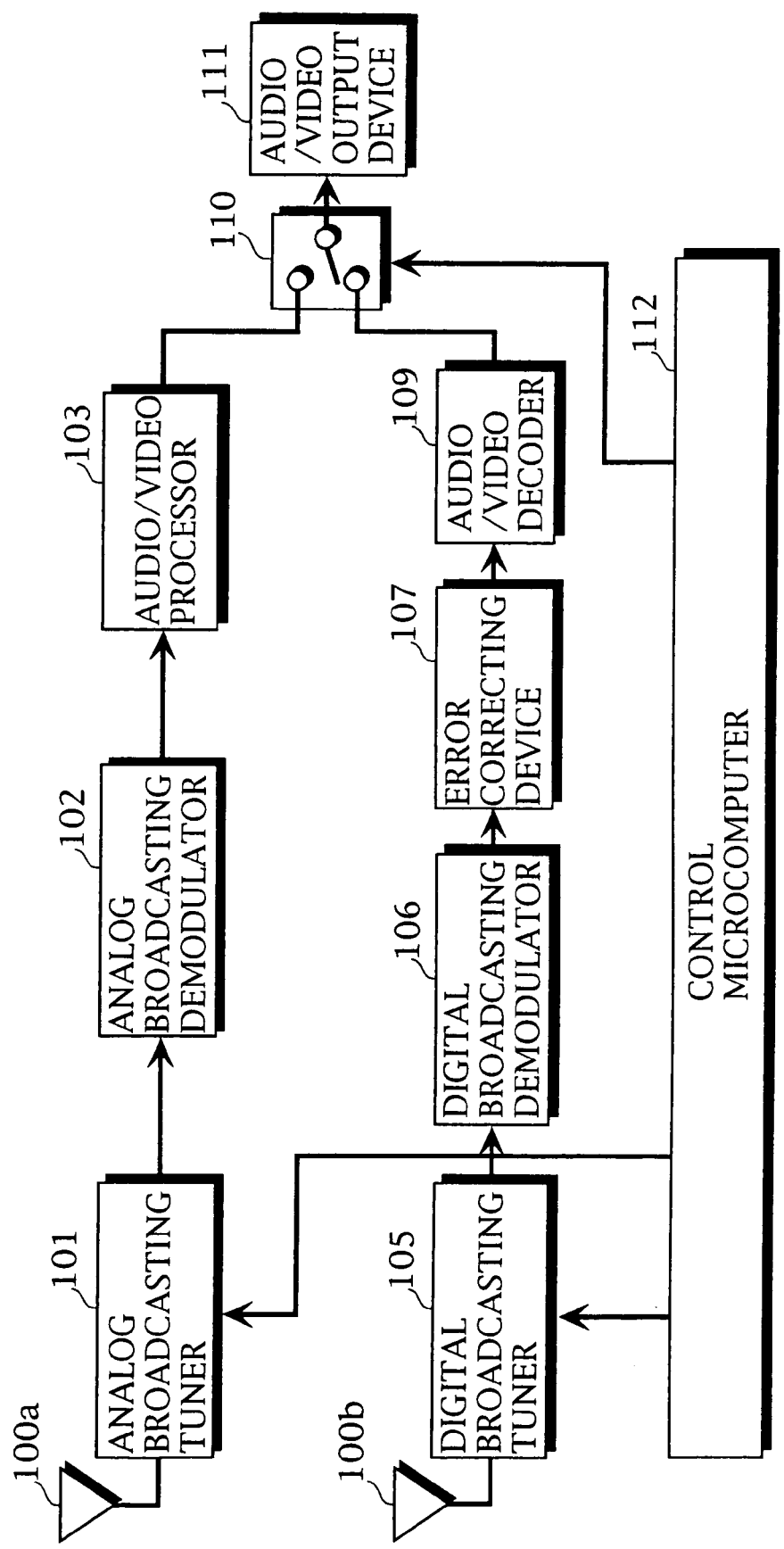
FIG. 4 is a block diagram showing the configuration of a conventional television receiver.

In FIG. 1, the same sections as those shown in FIG. 4 are assigned the same reference numerals and hence, the description thereof is not repeated.

In this example, data representing a correspondence between an arbitrary channel of digital television broadcasting and a channel (a frequency) of analog television broadcasting on which a program having the same contents as those of a program on the arbitrary channel is being broadcast shall be sent out by digital broadcasting waves.

Reference numeral 104 denotes an analog broadcasting video signal detector for detecting whether or not an effective video signal is included in received analog broadcasting waves, which detects a horizontal synchronizing signal in a normal video signal and judges the presence or absence of the video signal depending on whether or not its period is within a defined range. Reference numeral 108 denotes an error rate monitor for monitoring an error rate in an error correcting device 107.

Reference numeral 200 denotes a channel map data extracting circuit, and reference numeral 201 denotes a channel map data storage device. The channel map data extracting circuit 200 monitors a digital data string outputted from the error correcting device 107, extracts channel map information, and feeds the extracted channel map information to the channel map data storage device 201. The channel map data storage device 201 is constituted by a rewritable non-volatile memory, and stores the channel map information.

The flow of a received signal for each of the analog broadcasting and the digital broadcasting is as described in the prior art.

When a user issues an instruction by a remote control transmitter in order to view a digital broadcasting program, a control microcomputer 112 receives the instruction, issues an instruction to receive a frequency on a desired channel to a digital broadcasting receiving tuner 105, and switches a switching device 110 to the side of digital broadcasting. Consequently, an audio/video signal in the program designated by the user is outputted to an audio/video output device 111.

Additional information such as program information or channel map information is multiplexed on a portion, which is not used for audios and videos, of the data string in the received digital broadcasting. The channel map information is extracted by the channel map extracting circuit 200, and is stored in the channel map data storage device 201.

The control microcomputer 112 reads out channel frequency data in analog broadcasting in which the same program as that in digital broadcasting which is being currently received is being broadcast from the channel map data storage device 201, and issues an instruction to receive the broadcasting to an analog broadcasting receiving tuner 101. However, the switching device 110 remains switched to the digital side, and an audio/video signal for the digital broadcasting is outputted.

In such a state, the control microcomputer 112 periodically reads an error rate monitored by an error rate monitor 108, and judges, each time the error rate is read out, whether or not the error rate exceeds a previously set reference value.

The reference value is set, considering whether or not audios and videos which are worth viewing can be outputted. When the error rate exceeds the reference value, it is judged that the receiving quality in digital broadcasting is degraded, reads a judgment signal from a video signal detector 104 for analog broadcasting, and switches the switching device 110 to the side of analog broadcasting in a case where the judgment signal indicates that there is a video signal (in a case where analog broadcasting can be enjoyed). Consequently, an audio/video signal in an analog broadcasting program having the same contents as those of a digital broadcasting program which has been so far received is transmitted to the audio/video output device 111.

Even after the switching device 110 is switched to the side of analog broadcasting, the control microcomputer 112 continues to monitor the error rate obtained by the error rate monitor 108, switches, when the error rate is lowered to a state where the digital broadcasting program before the switching can be sufficiently viewed again, the switching device 110 to the digital side, and feeds the audio/video signal obtained by the digital broadcasting to the audio/video output device 111.

When the error rate obtained by the error rate monitor 108 is higher than the reference value, and the judgment signal from the analog broadcasting video signal detector 104 indicates that there is no video signal, the audio/video output device 111 indicates that neither the digital broadcasting nor the analog broadcasting is currently receivable by an on-screen display function which is normally provided in the audio/video output device 111, waits until either the digital broadcasting or the analog broadcasting is receivable, and outputs, at the time point where either the digital broadcasting or the analog broadcasting is receivable, audios and videos in the receivable broadcasting.

[2] Description of Second Embodiment

Figure 2:
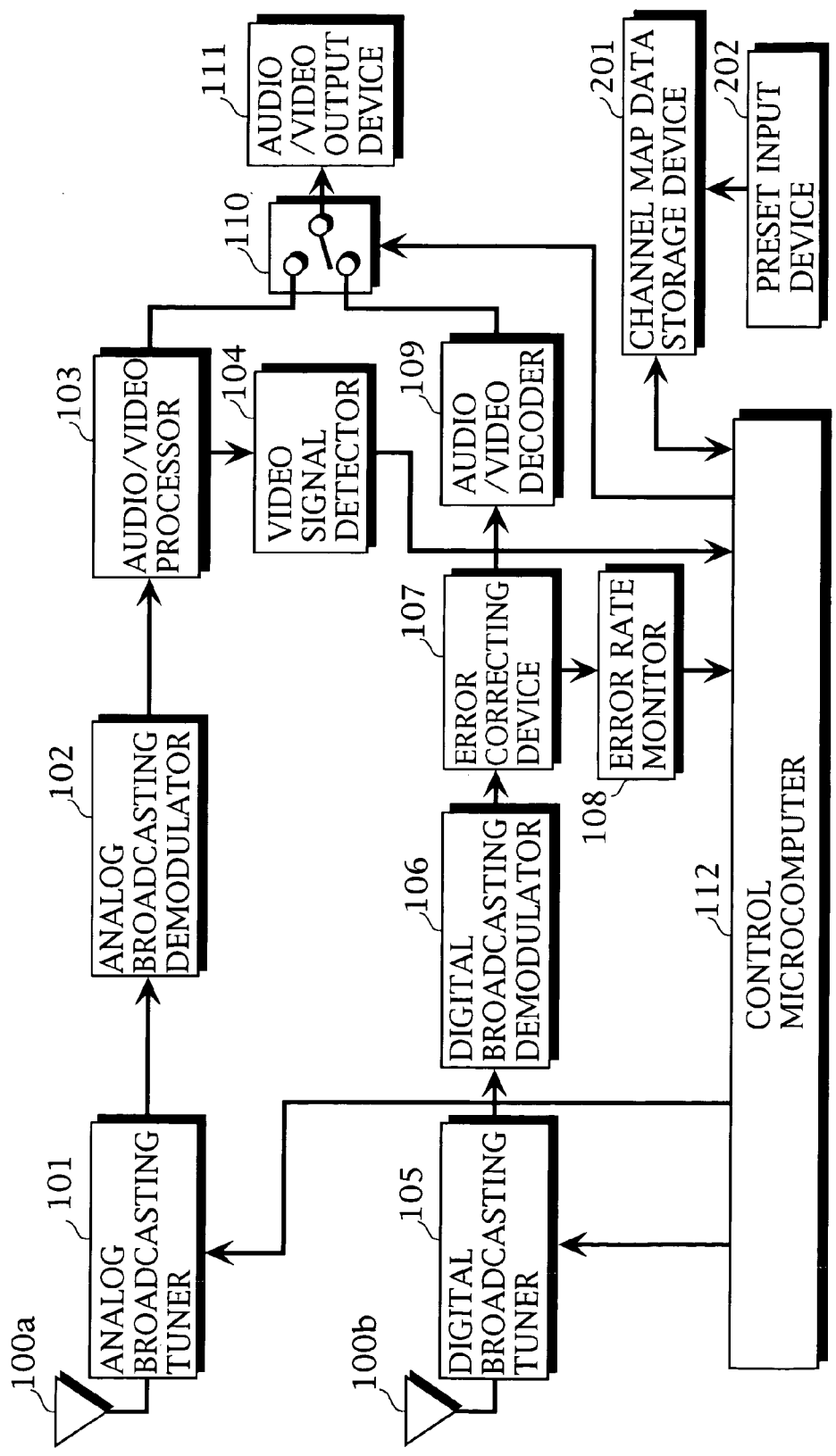
FIG. 2 is a block diagram showing the configuration of a television receiver according to a second embodiment.

FIG. 2 illustrates the configuration of a television receiver according to a second embodiment. In the television receiver, the channel map data extracting circuit 200 in the television receiver shown in FIG. 1 is replaced with a preset input device 202. In the television receiver, a producer enters channel map information using the preset input device 202 at the time of shipment from a factory, so that the channel map information is written into a channel map data storage device 201.

Several channel map information conforming to areas are previously set in the channel map data storage device 201 at the time of shipment from a factory. It is preferable that a user selects the area used by himself or herself so that the channel map information conforming to the area is specified. Further, it is preferable that the user can individually set the channel map information.

[3] Description of Third Embodiment

Figure 3:
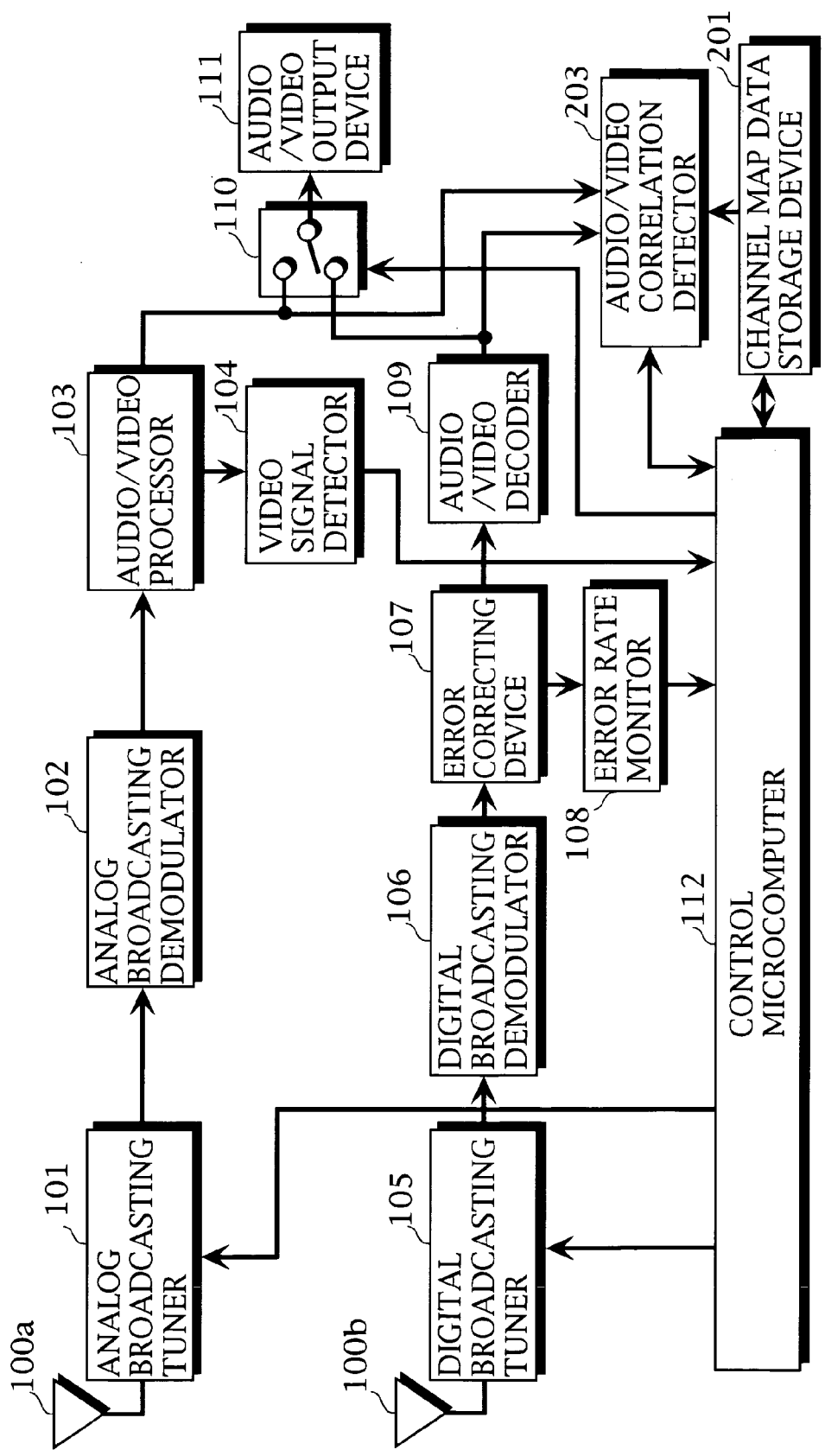
FIG. 3 is a block diagram showing the configuration of a television receiver according to a third embodiment.

FIG. 3 illustrates the configuration of a television receiver according to a third embodiment.

In the television receiver, the channel map data extracting circuit 200 in the television receiver shown in FIG. 1 is replaced with an audio/video correlation detector 203.

A channel map data storage device 201 shall store default channel map information at the time of shipment from a factory, as in the above-mentioned second embodiment.

The audio/video correlation detector 203 is constituted by two series of digital memories for analog broadcasting and digital broadcasting and a correlation detecting circuit, and has the function of receiving as inputs an audio/video signal from an analog broadcasting audio/video processor 103 and an audio/video signal from a digital broadcasting audio/video decoder 109, detecting the degree of correlation between analog and digital signals, and judging whether or not analog and digital broadcasting programs are the same.

Specifically, the input signal from the analog broadcasting audio/video processor 103 and the input signal from the digital broadcasting audio/video decoder 109 are compared with each other by respectively partitioning the signals into waveforms having a suitable length, storing the waveforms on a memory as digital data, and comparing the waveforms with each other. As the waveforms to be compared with each other, the waveform of a video signal or an audio signal or the waveforms of both of them may be used. When a user selects a certain digital broadcasting channel, a control microcomputer 112 issues an instruction to select the channel to a digital broadcasting receiving tuner 105, and switches a switching device 110 to the digital side. Consequently, audios and videos corresponding to a selected digital broadcasting program are outputted to the audio/video output device 111.

In this state, the control microcomputer 112 reads out channel frequency data in analog broadcasting in which the same program as that in digital broadcasting which is being currently received is being broadcast from the channel map data storage device 201, and issues an instruction to receive the broadcasting to an analog broadcasting receiving tuner 101.

The audio/video correlation detector 203 judges and confirms whether or not the received analog broadcasting program is the same as the digital broadcasting program which is being received. If they differ from each other, the control microcomputer 112 successively receives all analog broadcasting programs which can be received, searches for the same broadcasting program as the digital broadcasting program which is being currently received, newly writes the channel frequency data as updated data to the channel map data storage device 201 again, and uses the channel frequency data at the time of subsequent channel selection.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A television receiver comprising:
   a receiving section for digital television broadcasting;
   a receiving section for analog television broadcasting;
   switching means for switching an output of the receiving section for digital television broadcasting and an output of the receiving section for analog television broadcasting;
   a storage device, in which channel map information has previously been stored at the time of shipment from a factory, the channel map information indicating correspondence between and arbitrary channel of digital television broadcasting and a channel of analog television broadcasting on which a program having the same contents as those of a program on the arbitrary digital channel is being broadcast;
   first judging means for causing, when a digital television broadcasting program is selected, the receiving section for digital television broadcasting to receive the selected digital television broadcasting program, then controlling the switching means so as to select the output of the receiving section for digital television broadcasting, and judging whether or not an analog television broadcasting program having the same contents as those of the selected digital television broadcasting program is being broadcast based on the channel map information;
   means for causing, when the first judging means determines that the analog television broadcasting program having the same contents as those of the selected digital television broadcasting program is being broadcast, the receiving section for analog television broadcasting to receive the analog television broadcasting program having the same contents as those of the selected digital television broadcasting program;
   second judging means for judging whether the received analog television broadcasting program is the same program as the currently received digital television broadcasting program based on a degree of correlation of video signals between the digital and analog television broadcasting programs;
   channel searching means for switching, when the second judging means determines that the received analog television broadcasting program is not the same program as the currently received digital television broadcasting program, the channel on which the analog television broadcasting program is being broadcast, and then searching a channel on which an analog counterpart of the currently received digital television broadcasting program is being broadcast by judging whether a received analog television broadcasting program is the same program as the currently received digital television broadcasting program on the basis of a degree of correlation of video signals between the received analog television broadcasting program and the currently received digital television broadcasting program;
   means for causing, when a channel on which an analog counterpart of the currently received digital television broadcasting program is being broadcast is located by the channel searching means, the receiving section for analog television broadcasting to continue receiving the analog counterpart, while updating the channel map information to indicate the channel identified by the channel searching means as the corresponding analog channel on which the same program as the currently received digital television broadcasting program is being broadcast; and
   means for controlling, in a case where the analog television broadcasting program having the same contents as those of the selected digital television broadcasting program is being broadcast, the switching means so as to select the output of the receiving section for analog television broadcasting when the digital television broadcasting cannot be received.

2. A television receiver comprising:
   a receiving section for digital television broadcasting;
   a receiving section for analog television broadcasting;
   switching means for switching an output of the receiving section for digital television broadcasting and an output of the receiving section for analog television broadcasting;
   a storage device, in which channel map information has previously been stored at the time of shipment from a factory, the channel map information indicating correspondence between and arbitrary channel of digital television broadcasting and a channel of analog television broadcasting on which a program having the same contents as those of a program on the arbitrary digital channel is being broadcast;

first judging means for causing, when a digital television broadcasting program is selected, the receiving section for digital television broadcasting to receive the selected digital television broadcasting program, then controlling the switching means so as to select the output of the receiving section for digital television broadcasting, and judging whether or not an analog television broadcasting program having the same contents as those of the selected digital television broadcasting program is being broadcast based on the channel map information;

means for causing, when the first judging means determines that the analog television broadcasting program having the same contents as those of the selected digital television broadcasting program is being broadcast, the receiving section for analog television broadcasting to receive the analog television broadcasting program having the same contents as those of the selected digital television broadcasting program;

second judging means for judging whether the received analog television broadcasting program is the same program as the currently received digital television broadcasting program based on a degree of correlation of audio signals between the digital and analog television broadcasting programs;

channel searching means for switching, when the second judging means determines that the received analog television broadcasting program is not the same program as the currently received digital television broadcasting program, the channel on which the analog television broadcasting program is being broadcast, and then searching a channel on which an analog counterpart of the currently received digital television broadcasting program is being broadcast by judging whether a received analog television broadcasting program is the same program as the currently received digital television broadcasting program on the basis of a degree of correlation of audio signals between the received analog television broadcasting program and the currently received digital television broadcasting program;

means for causing, when a channel on which an analog counterpart of the currently received digital television broadcasting program is being broadcast is located by the channel searching means, the receiving section for analog television broadcasting to continue receiving the analog counterpart, while updating the channel map information to indicate the channel identified by the channel searching means as the corresponding analog channel on which the same program as the currently received digital television broadcasting program is being broadcast; and means for controlling, in a case where the analog television broadcasting program having the same contents as those of the selected digital television broadcasting program is being broadcast, the switching means so as to select the output of the receiving section for analog television broadcasting when the digital television broadcasting cannot be received.

* * * * *